US010441103B2

(12) United States Patent
Davis et al.

(10) Patent No.: US 10,441,103 B2
(45) Date of Patent: Oct. 15, 2019

(54) SLOW COOKING SYSTEM

(71) Applicant: Sunbeam Products, Inc., Boca Raton, FL (US)

(72) Inventors: Monte Davis, Boynton Beach, FL (US); Jamal F. Hammad, Boynton Beach, FL (US); Adam Day, Boynton Beach, FL (US); John Cheraso, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 451 days.

(21) Appl. No.: 15/219,106

(22) Filed: Jul. 25, 2016

(65) Prior Publication Data

US 2017/0020325 A1   Jan. 26, 2017

Related U.S. Application Data

(60) Provisional application No. 62/196,076, filed on Jul. 23, 2015.

(51) Int. Cl.
*A47J 27/12*   (2006.01)
*A47J 27/00*   (2006.01)

(52) U.S. Cl.
CPC .............. *A47J 27/12* (2013.01); *A47J 27/004* (2013.01)

(58) Field of Classification Search
CPC ...... A47J 127/12; A47J 27/004; A47J 27/122; A47J 27/13

(Continued)

(56) References Cited

U.S. PATENT DOCUMENTS

| D281,214 S | 11/1985 | Schaller |
| 4,649,810 A * | 3/1987 | Wong ............... A47J 27/14 222/501 |

(Continued)

FOREIGN PATENT DOCUMENTS

| CN | 201929703 U | 8/2011 |
| CN | 102078139 B | 4/2013 |
| CN | 102631128 B | 3/2014 |

OTHER PUBLICATIONS

Kohl's, Bella 3 x 1.5-qt Triple Slow Cooker, kohls.com, accessed: Jun. 2016. http://www.kohls.com/product/prd-1554500/bella-3-x-15-qt-triple-slow-cooker.jsp Bella triple slow cooker for entertaining guests has individual temperature controls for each pot.

(Continued)

*Primary Examiner* — Dana Ross
*Assistant Examiner* — Kuangyue Chen
(74) *Attorney, Agent, or Firm* — Husch Blackwell LLP (57) ABSTRACT

A slow cooker system including a plurality of slow cooker units including a stand having a pocket for receiving a first of the slow cooker units, a vertical support extending upwardly from the stand, and second and third slow cooker units each having an arm extending radially therefrom and pivotally attached to the vertical support above the first slow cooker unit. The second and third slow cooker units are pivotal between a non-use position and a use position where the first slow cooker may be accessed and slow cooking operations may be performed simultaneously in the first, second and third slow cooker units. The arms of the second and third slow cooker units are each pivotally attached to a ratcheting arrangement disposed in the vertical support to lock the second and third slow cooking units when moved to the use and non-use positions.

15 Claims, 6 Drawing Sheets

(58) Field of Classification Search
USPC .......................................................... 99/325
See application file for complete search history.

(56) References Cited

U.S. PATENT DOCUMENTS

| | | | |
|---|---|---|---|
| 5,527,008 A * | 6/1996 | Schutter | B60N 3/102 |
| | | | 224/926 |
| 5,535,664 A * | 7/1996 | Rokowski | A47J 36/32 |
| | | | 219/487 |
| 5,865,098 A | 2/1999 | Anelli | |
| D408,212 S | 4/1999 | Blaise | |
| 6,029,646 A | 2/2000 | Jackson | |
| 6,274,847 B1 | 8/2001 | Hlava et al. | |
| 6,415,710 B1 * | 7/2002 | Boone | A47J 37/0611 |
| | | | 99/375 |
| 6,624,399 B2 | 9/2003 | Rypan | |
| D488,951 S | 4/2004 | Josancy | |
| 6,763,965 B2 | 7/2004 | Parenteau | |
| 7,009,149 B2 * | 3/2006 | White | A47J 27/004 |
| | | | 219/429 |
| 7,485,831 B2 | 2/2009 | Tynes et al. | |
| 7,861,705 B2 | 1/2011 | Hulsey | |
| 7,943,888 B2 | 5/2011 | Barnes et al. | |
| D640,086 S * | 6/2011 | Day | D7/354 |
| D642,424 S | 8/2011 | Lavy et al. | |
| D651,039 S | 12/2011 | O'Neil et al. | |
| 8,739,380 B1 * | 6/2014 | Montgomery | A47J 37/0704 |
| | | | 126/25 A |
| D710,648 S | 8/2014 | Endres et al. | |
| 9,192,262 B2 | 11/2015 | Kanbur et al. | |
| 9,227,643 B1 * | 1/2016 | Bonilla | B62B 5/067 |
| 2004/0060456 A1 | 4/2004 | Chung | |
| 2006/0070532 A1 | 4/2006 | Chang | |
| 2009/0199839 A1 * | 8/2009 | Hulsey | A47J 37/07 |
| | | | 126/25 A |
| 2010/0229733 A1 | 9/2010 | Castillo | |
| 2013/0001216 A1 * | 1/2013 | Day | H05B 3/68 |
| | | | 219/521 |
| 2013/0298896 A1 | 11/2013 | Johnson | |
| 2015/0020693 A1 | 1/2015 | French et al. | |

OTHER PUBLICATIONS

WAYFAIR®, Platinum Deluxe 7.5 Qt. Stainless Steel Electric Buffet Server, Elite by Maxi-Matic, wayfair.com, accessed: Jun. 2016. http://www.wayfair.com/Elite-by-Maxi-Matic-Platinum-Deluxe-7 . 5-qt.-Stainless-Steel-Electric-Buffet-Server-EWM-9933-MXMT1098.html Keep the party going with the Deluxe Buffet Server by Elite Platinum with a total of three 2.5 quart buffet trays and a flat warming tray.

Betta, Sunbeam rice cooker/steamer—multi level, accessed: Jun. 2016. http://www.betta.com.au/sunbeam-st6650-rice-cooker-steamer-multi-level-356801 Prepare your complete meal in one piece with the Sunbeam VitaSteam 3-tier stackable system.

* cited by examiner

SLOW COOKING SYSTEM

CROSS-REFERENCE TO RELATED APPLICATIONS

This application claims benefit of U.S. Provisional Patent Application Ser. No. 62/196,076 Which was filed on Jul. 23, 2015, and that is incorporated in its entirety herein.

FIELD OF THE INVENTION

The invention relates to cooking appliances, and in particular, to a slow cooking system with a plurality of separate and distinct slow cooking units. More particularly, the invention relates to a slow cooking system having two slow cooking units oriented vertically that are modularly connected on a support structure and a third slow cooking unit beneath the other two slow cooking units mounted on the base of the support structure.

BACKGROUND OF THE INVENTION

Slow cookers are known in the prior art to prepare foods by cooking slowly at a reduced temperature allowing unattended cooking for many hours of pot roast, soups, stews, etc. Slow cookers are also useful for reheating foods and keeping food warm at dinners and parties making it desirable to have more than one slow cooker in use at a time. However, the use of multiple slow cookers at once creates a counter space problem and also a storage space problem.

SUMMARY OF THE INVENTION

In an embodiment of the invention, there is provided a slow cooker arrangement including a plurality of slow cooker units, a stand having a pocket for receiving a first of the slow cooker units, a vertical support extending upwardly from the stand, and at least a second slow cooker unit of the plurality of slow cooker units having an arm extending radially therefrom and pivotally attached to the vertical support above the first slow cooker unit. The at least second slow cooker unit is pivotal between a non-use position and a use position where the first slow cooker may be accessed and slow cooking operations may be performed simultaneously in the first and second slow cooker units.

In an embodiment of the invention, there is provided a slow cooker system including a plurality of slow cooker units, a stand having a pocket for receiving a first of the slow cooker units, a vertical support extending upwardly from the stand, a second slow cooker unit of the plurality of slow cooker units having an arm extending radially therefrom and pivotally attached to the vertical support above the first slow cooker unit and a third slow cooker unit of the plurality of slow cooker units having an arm extending radially therefrom and pivotally attached to the vertical support above the first slow cooker unit. The second and third slow cooker units are pivotal between a nonuse position and a use position where the first slow cooker may be accessed and slow cooking operations may be performed simultaneously in the first, second and third slow cooker units.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used herein for convenience only and is not to be taken as a limitation on the present invention. For example, the terms front, back, left and right are utilized herein to assist with understanding of relative positioning, but are not intended to be limiting to an orientation of use of the device. The following describes a preferred embodiment of the present invention. However, it should be understood, based on this disclosure, that the invention is not limited by the preferred embodiment described herein.

Referring to FIGS. 1-4, a slow cooker system 100 in accordance with an exemplary embodiment of the invention will be described. The slow cooker system 100 of the present embodiment generally comprises a plurality of slow cooker units 150, 160, 170 mounted on a stand 120. In this manner, multiple slow cooking and/or heating operations may be performed simultaneously for different foods. In other embodiments, the slow cooker units 150, 160, 170 may be any other type of cooking appliance such as electric cooktops, roasters, etc., but this is not meant to be limiting.

Figure 1:
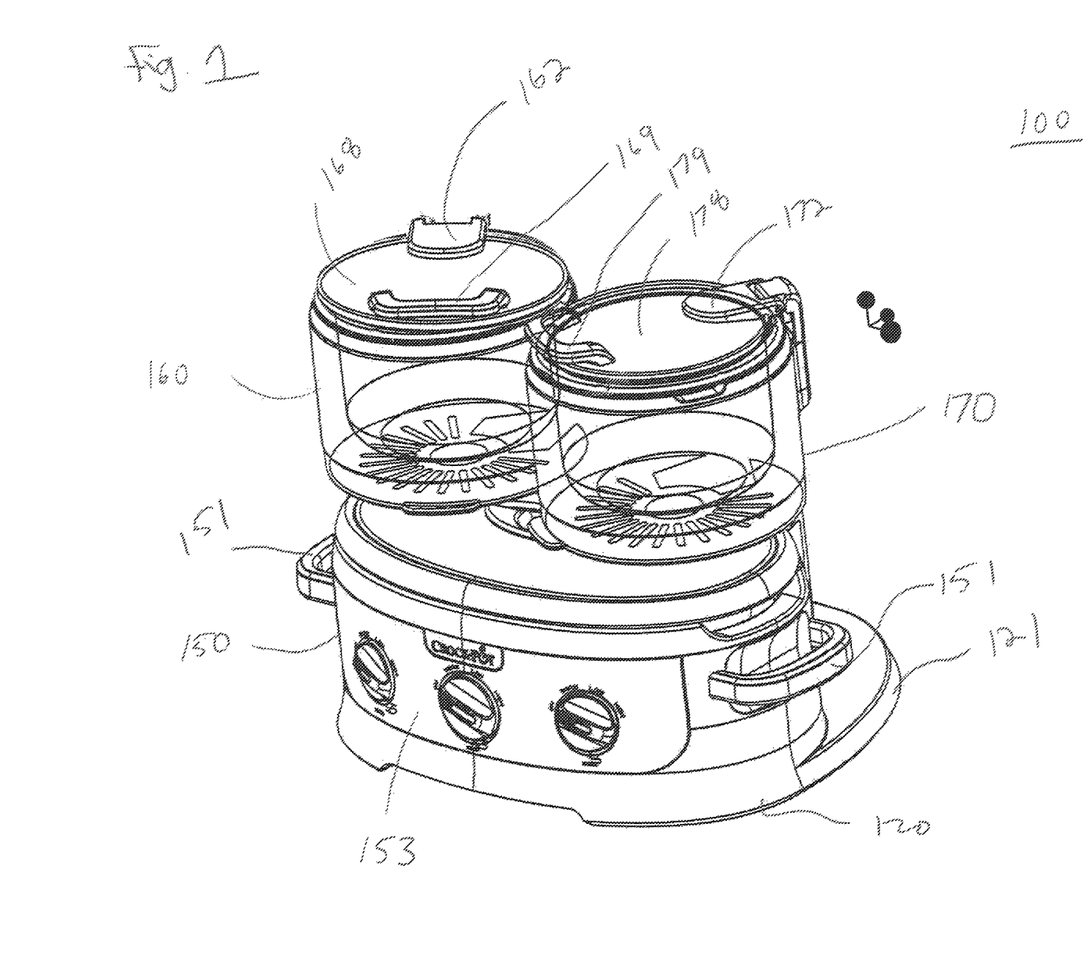
FIG. 1 is a perspective view of a slow cooker system in accordance with an exemplary embodiment of the present invention.
Figure 2:
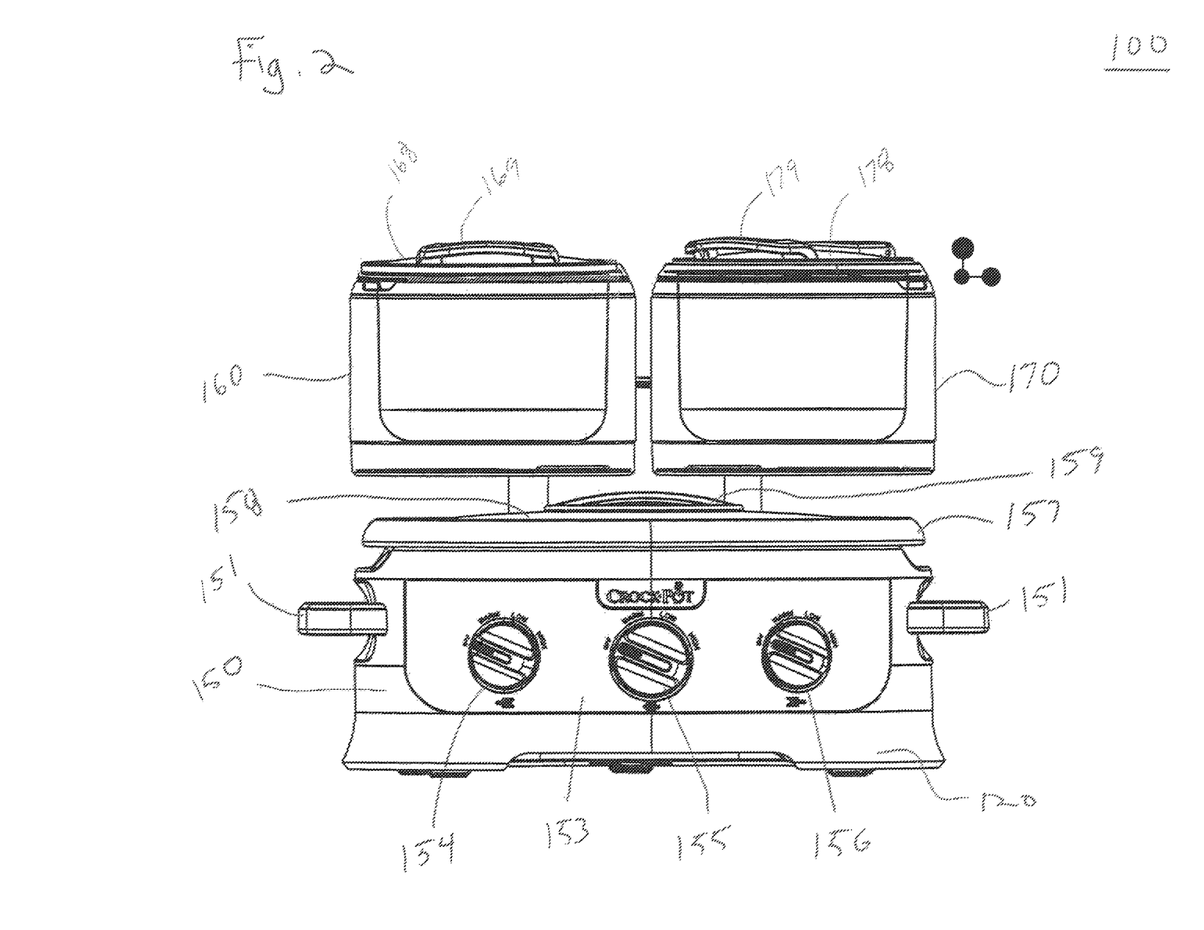
FIG. 2 is a front view of the slow cooker system of FIG. 1 illustrating the upper slow cooker units in the non-use position.

In an embodiment, a 35 (thirty-five) quart slow cooker unit 150 is mounted in a pocket 122 on the lower part of the stand 120 and two 15 (fifteen) quart slow cooker units 160, 170 are pivotally mounted on a vertical support 125 extending upwardly and attached to the rear of the stand 120. The slow cooker unit 160 is mounted on the left side of the vertical support 125 above the 35 quart slow cooker unit 150. The slow cooker unit 170 is mounted on the right side of the vertical support 125 above the 35 quart slow cooker unit 150. The pivotal attachment of the slow cooker units 160, 170 to the stand 120 allows the individual slow cooker units 160, 170 to be moved from their non-use position (FIGS. 1 and 2) to their use position (FIG. 3) allowing access to the 35 quart slow cooker unit 150 disposed beneath the slow cooker units 160, 170 and simultaneous slow cooking in all of the slow cooker units 150, 160, 170. The aforementioned arrangement of the slow cooker units 150, 160, 170 also allows for compact storage of the slow cooker system 100 when the slow cooker units 160, 170 are in their non-use position (FIGS. 1 and 2). The stand 120 includes a rearwardly extending ledge 121 for facilitating supporting the stand 120 and the slow cooker units 150, 160, 170 on a surface.

In an embodiment, an electronic control panel 153 is provided on the front of the 35 quart slow cooker unit 150 with electronic controls for controlling cooking operations of the cooker units 150, 160, 170. For example, there is provided an electronic control 154 for controlling cooking operations of the 35 quart slow cooker unit 150, an electronic control 155 for controlling cooking operations of the slow cooker unit 160 and an electronic control 156 for controlling cooking operation of the slow cooker unit 170. Each of the electronic controls 154, 155, 156 may be a rotary manual switch having discrete positions including "off", "low", "medium" and "high" positions but this is not meant to be limiting. The electronic controls 154, 155, 156 may be any other type of electronic controls including but not limited to tactile switches, sliding switches, LCD controls, etc.

Each of the aforementioned slow cooker units 150, 160, 170 are comprised of a housing, a stoneware cooking vessel, a lid, a thermostat (not shown), and a heating element (not shown) controlled by one of the electronic controls 154, 155, 156. An electrical power plug attached to an electrical power cord (not shown) may be plugged into a conventional source of electrical power (for example 120 v.a.c.) for providing electrical power to the electronic control panel 153. The electrical power cord (not shown) may be connected to a pair of electrical sockets 123 disposed in the pocket 122. A complementary pair of electrical posts 124 on the underside of the 35 quart slow cooker unit 150 are inserted into the electrical sockets 123 when the 35 quart slow cooker unit 150 is inserted into the pocket 122. The electrical posts 124 complete the electrical connection from the electrical power cord (not shown) to the electronic control panel 153. The 15 quart slow cooker units 160, 170 each include a hinge, 162, 172, respectively, that hingedly connected the lids 168, 178 to the housings 166, 176. Optionally, the 35 quart slow cooker unit 150 may include a hinge (not shown) to connect the lid 158 to the housing 152. Electrical power is provided to each of the slow cooker units 150, 160, 170 from the electronic control panel 153 by electrical wiring (not shown). A pair of handles 151, 151 on opposing ends of the 35 quart slow cooking unit 150 are provide for convenience.

In an embodiment, the stoneware cooking vessels 157, 167, 177 may be known in the prior art and generally include a flange or rim that extends radially outward from the open top end. The cooking vessels 157, 167, 177 have a configuration which complements the respective housings 152, 166, 176 such that the cooking vessels 157, 167, 177 are removably positionable therein. The housing 152 and the cooking vessel 157 of the 35 quart slow cooker unit 150 each have an elliptical configuration while the cooking vessels 167, 177 and the housings 166, 176 of the 15 quart slow cooker units 160, 170 have a circular configuration. The cooking vessels 157, 167, 177 are preferably made from earth ware (stoneware) but may be manufactured from glazed ceramic, porcelain, metal, or other suitable material known to one of ordinary skill in the art. In other embodiments, the cooking vessels 157, 167, 177 may be round, oblong, rectangular or other shape and any capacity such as 12 quart, 20 quart, 30 quart or other capacity. The lids 158, 168, 178 may have a handle 159, 169, 179 attached on an upper surface thereon for removing the lids 158, 168, 178 from the open top ends of the cooking vessels 157, 167, 177.

In an embodiment, the housings 166, 176 are mounted on a base 163, 173 and each base 163, 173 has a radially extending arm 164, 174 connected to it on one end. The opposite end of the arms 164, 174 are inserted into a socket 127, 127 on opposing sides of the vertical support 125. A pair of pins 145, 145 pass through the sockets 127, 127 and through apertures 164a, 174a formed in the free ends of the arms 164, 174 to secure the arms 164, 174 into the sockets 127. The pins 145, 145 are each a part of a pair of ratcheting arrangements 140, 140 that are installed in the vertical support 125 during construction of the stand 120. The ratcheting arrangements 140, 140 and pins 145, 145 allow the slow cooker units 160, 170 to pivot about the pins 145, 145 and lock between the non-use position (FIGS. 1 and 2) and the use position (FIG. 3) as described in more detail hereinbelow. A utensil tray 131 may be disposed in the vertical support 125 between the sockets 127, 127.

Figure 3:
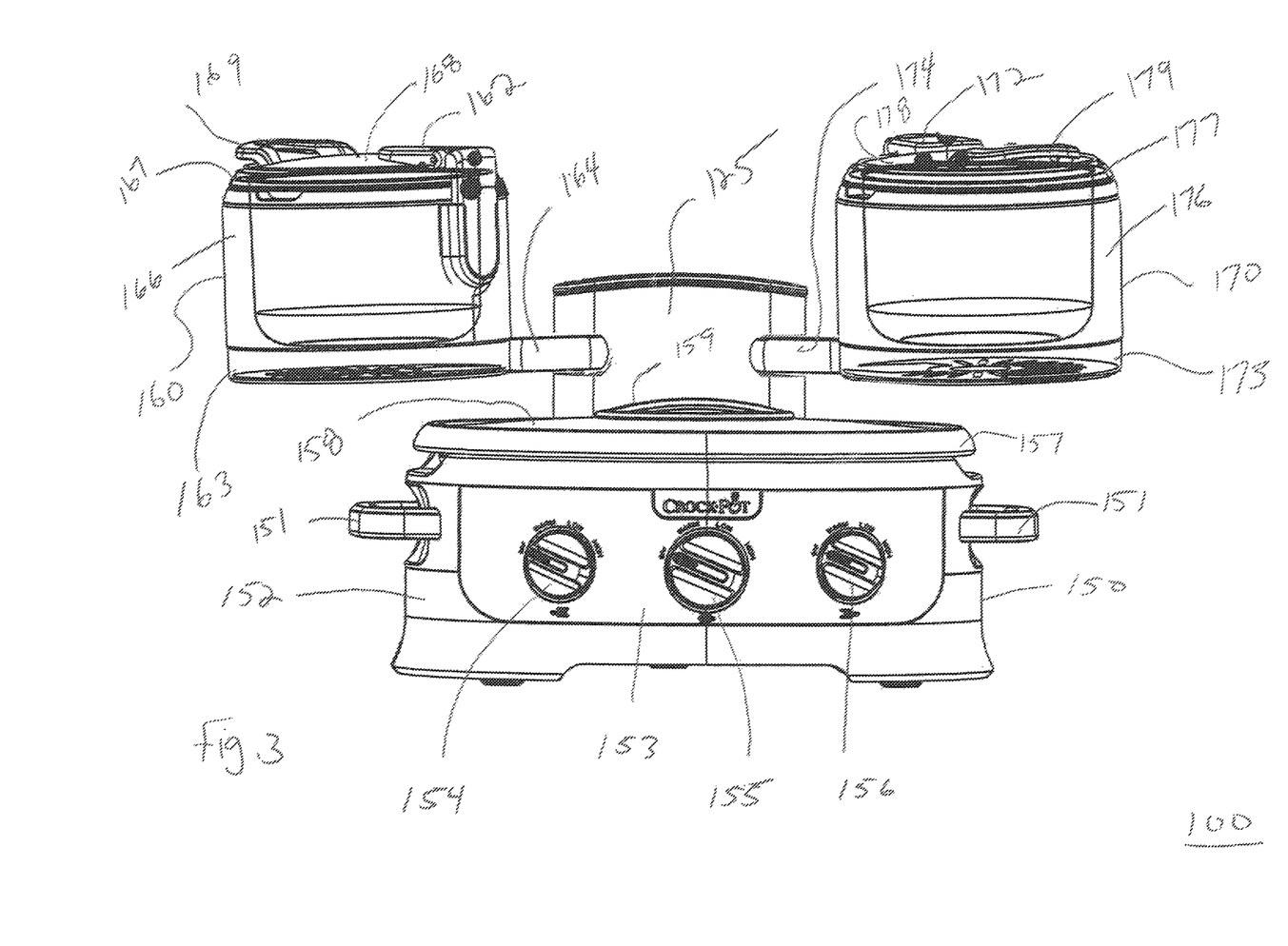
FIG. 3 is another front view of the slow cooker system of FIG. 1 illustrating the upper slow cooker units in the extended intended use position.
Figure 4:
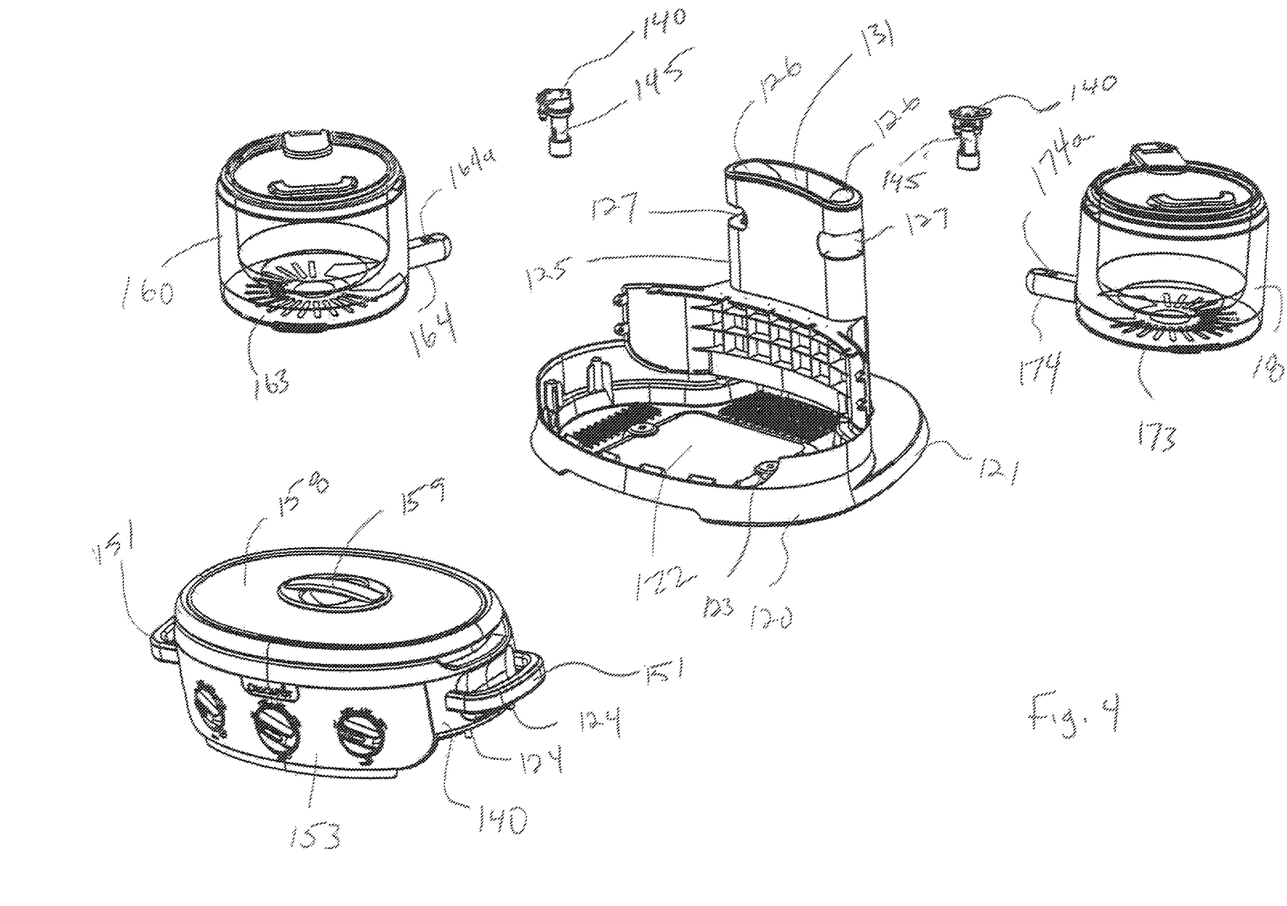
FIG. 4 is a partially exploded front perspective of the slow cooker system of FIG. 1.
Figure 5:
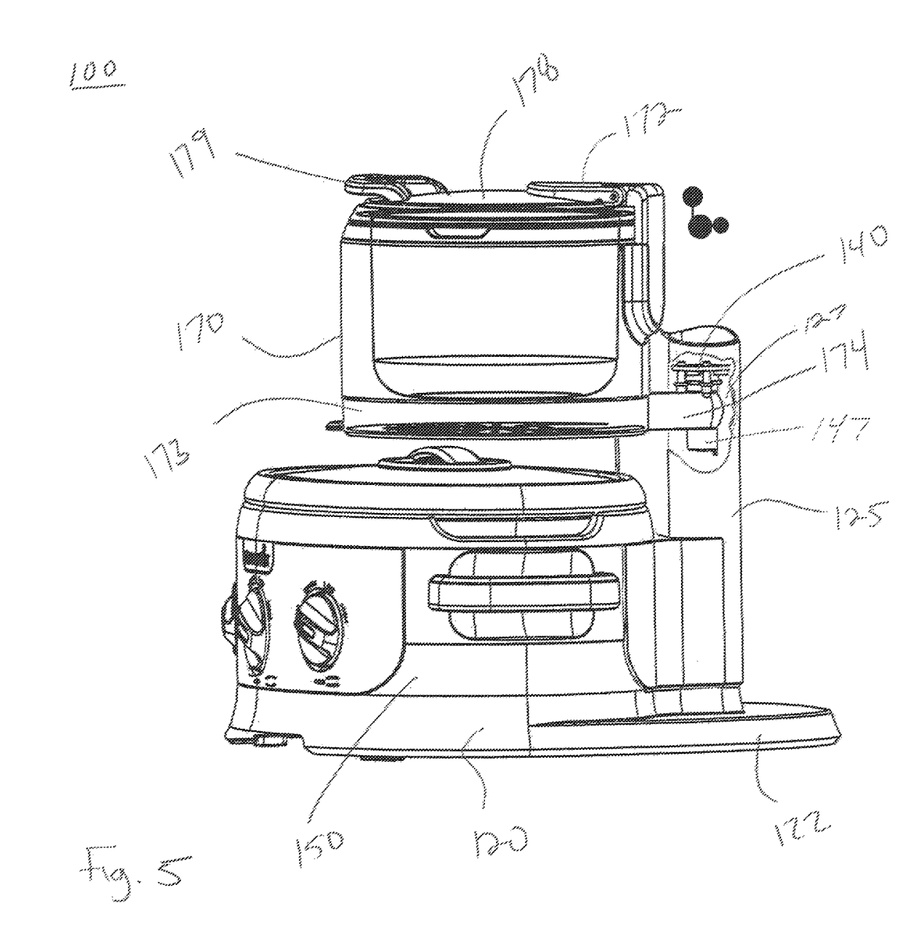
FIG. 5 is a partially cutaway side view of the slow cooker system of FIG. 1.
Figure 6:
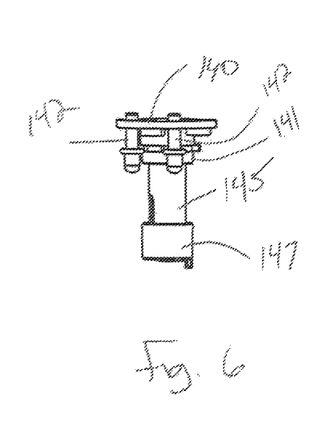
FIG. 6 is an enlarged view of the ratcheting arrangement illustrated in FIG. 5 connecting one of the upper slow cooker units to the vertical support.

Referring now also to FIGS. 5 and 6, there is illustrated the slow cooker system 100 with a partially cutaway view of the vertical support 125 to illustrate the ratcheting arrangement 140 and an enlarged view of the ratcheting arrangement 140. The arm 174 extending from the base 173 of the slow cooker unit 170 is mounted on the shaft 145 during construction of the vertical support 125 and stand 120. A cap 147 mounted on the bottom of the shaft 145 secures the arm 174 to the shaft A ratcheting disc 141 at the top of the ratcheting arrangement 140 has a plurality of radially spaced divots that engage a plurality of pins 142 as the arm 174 is rotated about the shaft 145 to lock the arm 174 in discrete positions representing the non-use positions (FIGS. 1 and 2) and the use position (FIG. 3) of the slow cooker unit 170. An identical ratcheting arrangement 140 is provided on the opposite side of the vertical support 125 to lock the slow cooker unit 160 in the non-use position (FIGS. 1 and 2) and the use position (FIG. 3).

Figure 7:
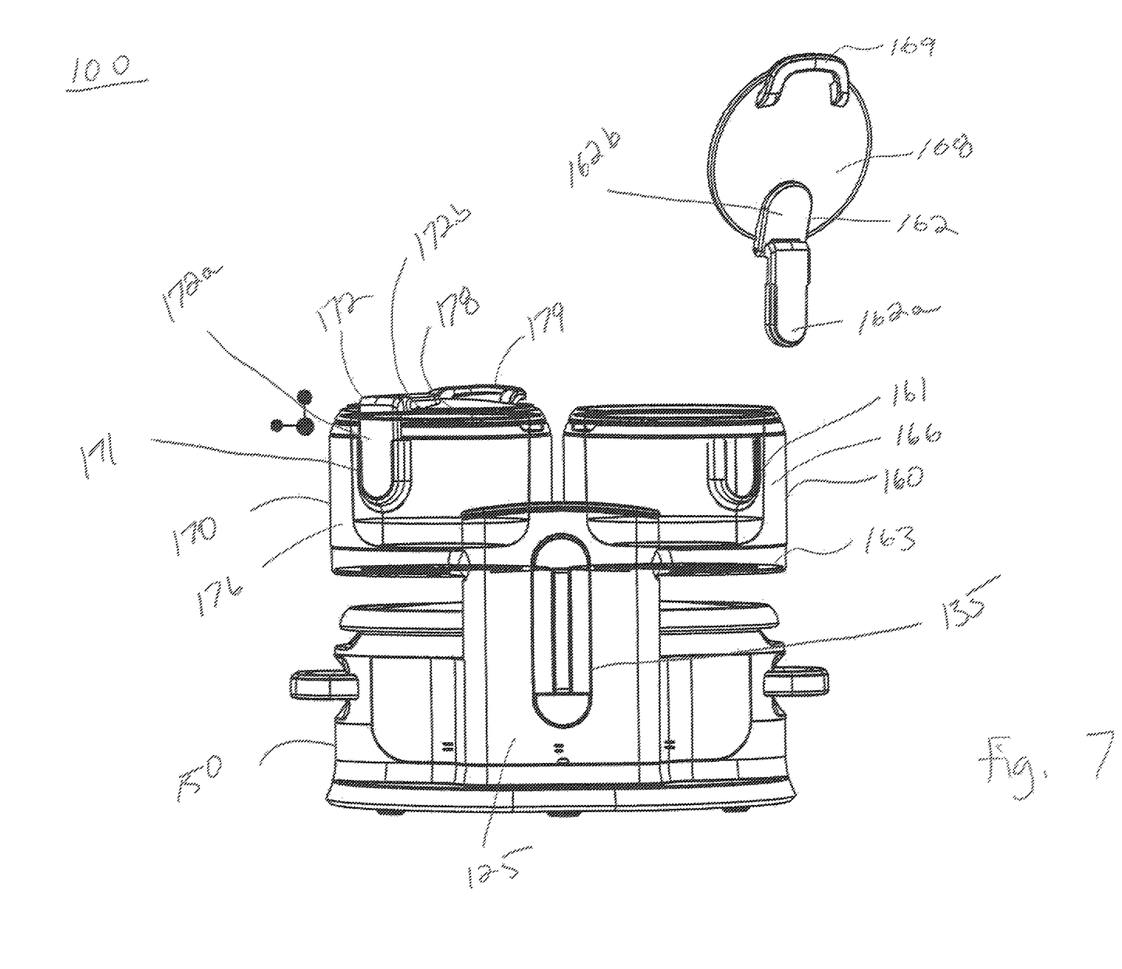
FIG. 7 is a rear view of the slow cooker system of FIG. 1.

Referring now also to FIG. 7, there is illustrated the lid 168 of the slow cooker unit 160 removed from the housing 166. In use, the lid 168 is hingedly connected to the housing 166 by a lower portion 162a of the hinge 162 being slidingly inserted into a u-shaped channel 161 disposed on the housing 166. The lower portion 162a of the hinge 162 is hingedly connected to an upper portion 162b of the hinge 162 which is affixed to the lid 168. The lid 178 of the slow cooker unit 170 is likewise hingedly connected to the housing 176 by a lower part 172a of the hinge 172 being slidingly inserted into a u-shaped channel 171 disposed on the housing 176. The lower portion 172a of the hinge 172 is hingedly connected to an upper portion 172b of the hinge 172 affixed to the lid 178. For convenience, a cord wrap 135 is disposed on the rear of the vertical support 125.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:
1. A slow cooker system, comprising;
a plurality of slow cooker units, each of said plurality of slow cooker units including a cooking vessel formed by a bottom surface and a sidewall extending therefrom, such that said cooking vessel being capable of containing a liquid, each cooking vessel being entirely selectively removable from its respective slow cooker unit;

a stand having a pocket for receiving a first of the slow cooker units;
a vertical support extending upwardly from the stand; and
at least a second slow cooker unit of the plurality of slow cooker units having an arm extending radially therefrom and pivotally attached to the vertical support above the first slow cooker unit;
wherein the at least second slow cooker unit is pivotal between a non-use position and a use position where the first slow cooker may be accessed and slow cooking operations may be performed simultaneously in the first and second slow cooker units.

2. The slow cooker system of claim 1, further including an electronic control panel disposed on the first slow cooker unit having individual electronic controls for each of the plurality of slow cooker units for controlling cooking operations of each of the plurality of slow cooker units.

3. The slow cooker system of claim 1, further including:
a third slow cooker unit having an arm extending radially therefrom and pivotally attached to the vertical support above the first slow cooker unit.

4. The slow cooker system of claim 3, wherein the third slow cooker unit is pivotal between a non-use position and a use position where the first slow cooker may be accessed and slow cooking operations may be performed simultaneously in the first, second and third slow cooker units.

5. The slow cooker system of claim 1, wherein the second slow cooker unit is pivotally attached to the left side of the vertical support.

6. The slow cooker system of claim 3, wherein the third slow cooker unit is pivotally attached to the right side of the vertical support.

7. The slow cooker system of claim 1, further including a ratcheting arrangement disposed in the vertical support wherein the arm of the at least a second slow cooker unit is pivotally connected to, the pivoting ratcheting arrangement having discrete positions for locking the at least second slow cooker unit into the use and non-use positions.

8. The slow cooker system of claim 3, further including a ratcheting arrangement disposed in the vertical support wherein the arm of the third slow cooker unit is pivotally connected to, the pivoting ratcheting arrangement having discrete positions for locking the third slow cooker unit into the use and non-use positions.

9. The slow cooker system of claim 1, further including a utensil tray disposed in the vertical support.

10. A slow cooker system, comprising
a plurality of slow cooker units;
a stand having a pocket for receiving a first of the slow cooker units;
a vertical support extending upwardly from the stand; and,
a second slow cooker unit of the plurality of slow cooker units having an arm extending radially therefrom and pivotally attached to the vertical support above the first slow cooker unit;
a third slow cooker unit of the plurality of slow cooker units having an arm extending radially therefrom and pivotally attached to the vertical support above the first slow cooker unit;
wherein the second and third slow cooker units are pivotal between a non-use position and a use position where the first slow cooker may be accessed and slow cooking operations may be performed simultaneously in the first, second and third slow cooker units;
and wherein each of the plurality of slow cooker units includes a respective lid, each lid having at most one aperture extending therethrough, each lid being selectively engageable with its respective slow cooker unit in both the non-use position and use position.

11. The slow cooker system of claim 10, further including an electronic control panel disposed on the first slow cooker unit having individual electronic controls for each of the first, second and third slow cooker units for controlling cooking operations of each of the plurality of slow cooker units.

12. The slow cooker system of claim 10, wherein the second slow cooker unit is pivotally attached to the left side of the vertical support.

13. The slow cooker system of claim 10, wherein the third slow cooker unit is pivotally attached to the right side of the vertical support.

14. The slow cooker system of claim 10, further including ratcheting arrangements disposed in the vertical support wherein the arms of the second slow cooker unit and the third second slow cooker units are pivotally connected to, the pivoting ratcheting arrangements having discrete positions for locking the second slow cooker unit and the third slow cooker units into the use and non-use positions.

15. The slow cooker system of claim 10, further including a utensil tray disposed in the vertical support.

* * * * *